United States Patent
Mathon et al.

(10) Patent No.: US 12,286,841 B2
(45) Date of Patent: Apr. 29, 2025

(54) DIMENSIONING OF A THREADED AXIAL GAP

(71) Applicants: VALLOUREC OIL AND GAS FRANCE, Aulnoye-Aymeries (FR); NIPPON STEEL CORPORATION, Tokyo (JP)

(72) Inventors: Thibault Mathon, Meudon (FR); Laurent Boufflers, Meudon (FR); Matthieu Luongo, Meudon (FR)

(73) Assignees: VALLOUREC OIL AND GAS FRANCE, Aulnoye-Aymeries (FR); NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/552,288

(22) PCT Filed: Mar. 21, 2022

(86) PCT No.: PCT/FR2022/050508
§ 371 (c)(1),
(2) Date: Sep. 25, 2023

(87) PCT Pub. No.: WO2022/207995
PCT Pub. Date: Oct. 6, 2022

(65) Prior Publication Data
US 2024/0159113 A1    May 16, 2024

(30) Foreign Application Priority Data
Mar. 31, 2021 (FR) .................................. 2103327

(51) Int. Cl.
*E21B 17/042* (2006.01)
*F16L 15/00* (2006.01)
*F16L 15/06* (2006.01)

(52) U.S. Cl.
CPC .......... *E21B 17/042* (2013.01); *F16L 15/001* (2013.01); *F16L 15/06* (2013.01)

(58) Field of Classification Search
CPC ....... F16L 15/001; F16L 15/06; E21B 17/042; E21B 17/0426
See application file for complete search history.

(56) References Cited

U.S. PATENT DOCUMENTS 4,582,348 A * 4/1986 Dearden ............... E21B 17/042
5,360,239 A * 11/1994 Klementich .......... F16L 15/001
(Continued)

FOREIGN PATENT DOCUMENTS

FR    2 952 993 A1    5/2011
FR    2 953 272 A1    6/2011
(Continued)

OTHER PUBLICATIONS

International Search Report mailed on May 16, 2022 in PCT/FR2022/050508 filed on Mar. 21, 2022 (4 pages).

*Primary Examiner* — William S. Choi
(74) *Attorney, Agent, or Firm* — Oblon, McClelland, Maier & Neustadt, L.L.P.

(57) ABSTRACT

A tubular threaded joint for the drilling, operation of hydrocarbon wells, transport of oil and gas, carbon capture or geothermal energy, comprising a male tubular element and a female tubular element, each of said male or female tubular elements comprising respectively a male threaded portion and a female threaded portion, one or the other of the male or female threaded portions optionally comprising an anticorrosive and/or lubricating solid coating, said male threaded portion and female threaded portion comprise respectively at least one male threading tooth or one female threading tooth and a threaded axial gap TAG ensuring a space, in the mounted state, between an stab flank of said male threading tooth and a load flank of said female thread- (Continued)

ing tooth, wherein said threaded axial gap TAG is greater than or equal to a minimum gap TAGmin.

7 Claims, 4 Drawing Sheets

(56) References Cited

U.S. PATENT DOCUMENTS

| | | | |
|---|---|---|---|
| 5,419,595 A | | 5/1995 | Yamamoto et al. |
| 5,829,797 A * | | 11/1998 | Yamamoto ............ F16L 15/001 |
| 7,334,821 B2 * | | 2/2008 | Dutilleul ................ E21B 17/042 |
| 9,194,190 B2 * | | 11/2015 | Sonobe ................... F16L 15/06 |
| 2009/0200798 A1 | | 8/2009 | Hamamoto et al. |
| 2011/0278838 A1 * | | 11/2011 | Martin .................. E21B 17/042 |
| 2012/0286507 A1 | | 11/2012 | Maillon et al. |
| 2013/0069364 A1 | | 3/2013 | Martin et al. |
| 2019/0093799 A1 * | | 3/2019 | Sugino ................... F16L 15/06 |

FOREIGN PATENT DOCUMENTS

| | | |
|---|---|---|
| FR | 3 098 878 A1 | 1/2021 |
| FR | 3 098 879 A1 | 1/2021 |
| WO | WO 2007/114460 A1 | 10/2007 |

* cited by examiner

DIMENSIONING OF A THREADED AXIAL GAP

TECHNICAL FIELD

The invention relates to steel components or pipes in the field of oil and gas, energy or storage, for a use such as the operation of wells or the transport of hydrocarbons, the hydrogen transport or storage, geothermal energy or carbon capture.

TECHNOLOGICAL BACKGROUND

Herein, the term "component" means any element, accessory or pipe, used to drill or operate a well and comprising at least one connection or connector or even a threaded end, and intended to be assembled by threading to another component to constitute a threaded joint with this other component. The component can be, for example, a tube or a tubular element of relatively great length (in particular about ten metres in length), for example a tube, or even a tubular sleeve of a few tens of centimetres in length, or even an accessory of these tubular elements (suspension device or "hanger", section change part or "cross-over", safety valve, connector for drill rod or "tool joint", "sub", and the like).

The components or pipes have threaded ends. These threaded ends are complementary allowing the coupling of two male ("Pin") and female ("Box) tubular elements therebetween. There is therefore a male threaded end and a female threaded end. The threaded ends called premium or semi-premium threaded ends generally include at least one stop surface. A first stop may be formed by two surfaces of two threaded ends, oriented substantially radially, configured so as to be in contact with each other after screwing the threaded ends to each other or during compressive stresses. The stops generally have negative angles relative to the main axis of the connections. Intermediate stops on joints are also known including at least two threading stages. The threaded end, the stop surface as well as a sealing surface can form an assembly called a lip. There may be a lip with a threading oriented outwardly of the tube, that is to say, a male lip, and a lip with a threading oriented inwardly of the tube, that is to say, a female lip.

The machining of a tube to produce its threading implies the existence of a threading pitch. The notion of threading pitch must be understood in the light of ISO 5408:2009 which deals with the definition of threads. The threading pitch must be controlled in order to avoid assembly problems and the use of a joint, between the male threading and the corresponding female thread.

It is possible that an unforeseen deviation between, on the one hand, a pitch of the male portion or a pitch of the female portion and, on the other hand, with the theoretical pitch occurs due to the imprecision of the method or threading tools used during machining. This deviation is called a pitch error. There are devices which allow measuring a threading pitch and which allow measuring a pitch error or to detect an unacceptable pitch error and to proceed to the rejection of the concerned threaded component. An example of a measuring device is described in the standard API SPECIFICATION 5B«GAUGING AND INSPECTION OF CASING, TUBING, AND LINE PIPE THREADS».

However, it is possible that the measurement is inaccurate due to the measuring apparatus itself, which can admit imperfections. In general, there are safety standards and margins of error to be taken into account also for this type of apparatuses.

Problems can arise after screwing together the two male and female tubular elements. Indeed it is difficult to measure the pitches in the joined state, and therefore to possibly detect pitch errors. A pitch error can be detected by analysing the screwing curves (see FIG. 10), but at this stage it is already too late and the two concerned tubes must be rejected. The rejection criteria appear in the supplier specifications, for example the "VAM book". Thus it happens to generate during machining, despite the precautions and safety measures, several small pitch errors which can be individually tolerable and included in an acceptable margin of error. The tube can thus be validated, while it comprises an accumulation of small acceptable pitch errors and continue its industrial cycle. The applicant has been able to identify and establish surprisingly that the accumulation of the pitch errors which may be individually acceptable, can contribute to an offset in the thread flanks over the entire threading. This accumulation and/or this offset when it exceeds a certain threshold and when it is opposed on a male and female tubular element creates a pitch mismatch, the latter has the consequence of generating an axial interference or a docking problem between thread flanks. This axial interference or docking problem can cause a much too high stress on one or more places of the threading due to the compression of two male and female threading teeth. This excessive stress is capable of generating a docking between threads at a too high number of screwing revolutions, to the detriment of screwing for which the correct positioning of the male portion vis-à-vis the female portion can no longer be ensured. This can imply both a risk of embrittlement or plasticisation of the connection, as well as a risk of loss of sealing which can lead to leaks of the connection. A leak can cause considerable economic and even environmental consequences, for example when a leak occurs in a hydrocarbon well during its operation.

The consequences due to the pitch mismatch, and consequently leakage problems, are all the more accentuated when applying a solid coating with anticorrosion or lubricating type properties.

The invention allows overcoming all previously mentioned problems. In particular, the invention proposes a configuration capable of eliminating the consequences of pitch errors and in particular their accumulation in the threading, while ensuring an absence of axial interference or docking problems as well as a sealing.

According to one embodiment, the invention provides a tubular threaded joint for the drilling, operation of hydrocarbon wells, transport of oil and gas, carbon capture or geothermal energy, comprising a male tubular element and a female tubular element, each of said male or female tubular elements comprising respectively a male threaded portion and a female threaded portion, one or the other of the male or female threaded portions optionally comprising an anticorrosive and/or lubricating solid coating, said male threaded portion and female threaded portion comprise respectively at least one male threading tooth or one female threading tooth and a threaded axial gap TAG ensuring a space, in the mounted state, between a stab flank of said male threading tooth and a load flank of said female threading tooth, characterised in that said threaded axial gap TAG is greater than or equal to a minimum gap TAGmin such that:

$$TAGmin = IT(\min) * \left(1/2\frac{(LFpin\min)}{(DPin\min)} + 1/2\frac{(LFbox\min)}{(Dbox\min)}\right) + (4*Epcoat) \quad \text{[Math. 1]}$$

With: 0≤Epcoat≤Epcoat max
Where:

| | |
|---|---|
| TAGmin | Minimum value of the threaded axial gap in mm |
| ITmin | Minimum value of the pitch mismatch tolerance in mm |
| LFpinmin | Minimum value of the axial male threading length in mm |
| LFboxmin | Minimum value of the axial female threading length in mm |
| Dpinmin | Minimum value of the distance of the male pitch tolerance in mm |
| Dboxmin | Minimum value of the distance of the female pitch tolerance in mm |
| Epcoat | Value of the thickness of an anticorrosive and/or lubricating coating in mm |

Thanks to this feature, a joint according to the invention has a threaded axial gap (TAG) which respects a minimum threshold from which it is ensured to compensate for the effect of any threading offset resulting from an accumulation of pitch error. This accumulation can also result from several individually acceptable pitch errors.

Surprisingly, when the equation is satisfied, the risks of pitch mismatch, which may exist from one connection to another, are absorbed in a sufficiently large threaded axial gap. Any risk of axial interference and therefore of embrittlement and plasticisation due to an offset caused by a very significant pitch mismatch is therefore totally eliminated.

The term "Threaded Axial Gap" (TAG) means the distance separating a stab flank of a male threading tooth and a stab flank of a female threading tooth facing the stab flank of the male threading tooth, which can be expressed in mm. This threaded axial gap is measured at half the height of the male tooth.

The term "pitch error" means the offset which results from the comparison between a real pitch, that is to say, the pitch measured on a produced part and a pitch in the plane, that is to say, the pitch initially defined on the product plan.

The term "individually acceptable pitch error" means any pitch error per thread which is sufficiently small and tolerable to be validated during the monitoring of the thread after machining, the reference values being defined on plan and/or by standard.

The term "pitch mismatch" means the difference between the cumulative pitch error on the male threading and the accumulation of pitch error on the female threading.

In parallel, this equation also allows ensuring that the level of screwing is monitored.

According to one embodiment, the pitch mismatch tolerance value is comprised between 0.040 and 0.080 mm, preferably between 0.048 and 0.072 mm.

Thanks to this feature, the pitch error can be measured by a conventional monitoring device, for example described in API 5B1. Indeed, below the tolerance, it should be required to use more expensive devices whose measurement result is not necessarily assured. It is not desirable to have a tolerance value greater than 0.080 mm.

According to one embodiment, the tubular threaded joint is characterised in that the threaded axial gap TAG is less than or equal to a maximum gap TAGmax such that:

$$TAGmax = a*PinLipSurface + b + (4*Epcoat) \quad \text{[Math 2]}$$

With: 0≤Epcoat≤Epcoat max
a=0.00053
b=0.14
Where:
PinLipSurface Value of the cross-sectional area of the male lip between the sealing surface and the stop surface in mm 2
a Value of the slope of the correlation
b Value of the intercept
Epcoat Value of the thickness of an anticorrosive and/or lubricating coating in mm Thanks to this feature, the risk of loss of sealing performance due to a threaded axial gap TAG which would be too high is eliminated.

The term "sealing performance" means the resistance of the connection to combined stresses both external/internal pressure and traction/compression. The sealing can be liquid or gas sealing.

Thanks to this feature, a joint according to the invention is more robust under stresses which require compression.

Indeed, a too large threaded axial gap can lead to an over-stressing at the lip and therefore a plasticisation when the connection is stressed in compression. This over-stressing can lead to a leak.

Thus, the sealing of a connection is therefore not only ensured when the equation is satisfied, but the applicant has observed an improvement in sealing performance with several types of connections according to the invention.

According to one embodiment, the threaded axial gap TAG is comprised between two values TAGmin and TAGmax such that: TAGmin<TAGmax.

According to one embodiment, the tubular threaded joint (1) is characterised in that at least one of the male threaded portions (4) or female threaded portions (5) comprises an anticorrosive and/or lubricating coating and in that the value of the thickness of the anticorrosive and/or lubricating coating (10) Epcoat is greater than zero.

Thanks to this feature, the addition of a solid anticorrosive and/or lubricating coating on the thread increases the risks of unwanted axial interference. Indeed, the thickness of a solid coating can contribute to increase the contact pressure on the flanks of a thread increasing the risk of embrittlement or plasticisation. The invention then allows screwing without additional risk of embrittlement or plasticisation of a connection due to a coating in a threading.

According to one embodiment, the tubular threaded joint is characterised in that the maximum value of the thickness of an antic anticorrosive and/or lubricating coating Epcoat max is equal to 0.0075 mm.

Thanks to this feature, the configuration can integrate a wide variety of anticorrosive and/or lubricating solid coatings, which allows eliminating the risk associated with the pitch mismatch to a maximum value of 0.0075 mm.

According to one embodiment, the anticorrosive and/or lubricating coating comprises a layer comprising zinc and nickel.

BRIEF DESCRIPTION OF FIGURES

The invention will be better understood, and other aims, details, features and advantages thereof will appear more clearly during the following description of several particular embodiments of the invention, given only for illustrative and non-limiting purposes, with reference to the appended drawings.

DESCRIPTION OF THE EMBODIMENTS

In the in the remainder of the description, the terms "longitudinal", "transverse", "vertical", "front", "rear", "left" and "right" are defined according to a usual orthogonal reference frame as represented in the drawings, which comprises:

a horizontal longitudinal axis X, and from left to right, sectional views;

Moreover, in the description and the claims, the terms "external" or "internal" and the "axial" and "radial" orientations" will be used to designate, according to the definitions given in the description, elements of the tubular threaded joint. The longitudinal axis X determines the "axial" orientation. The "radial" orientation is directed orthogonally to the longitudinal axis X.

Figure 1:
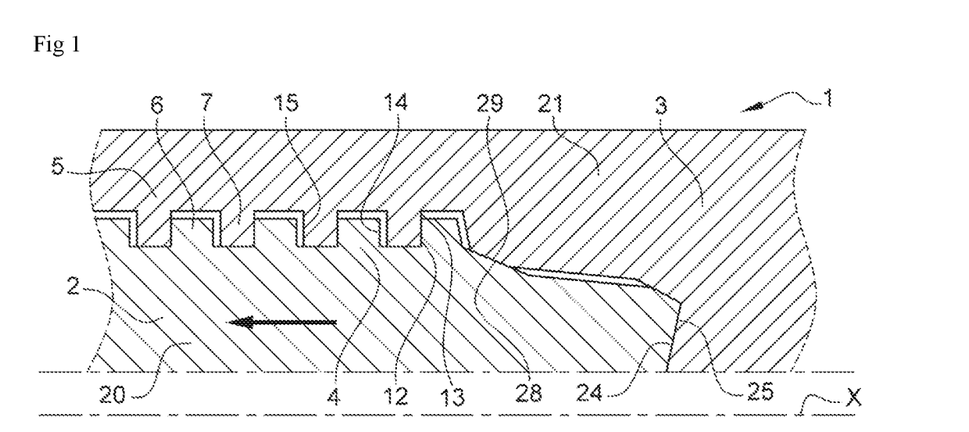
FIG. 1 schematically describes, in a longitudinal sectional view, a tubular threaded joint according to the invention, with contact of the load flanks.

FIG. 1 describes a tubular threaded joint (1) according to the invention comprising a male tubular element (2) comprising a male threaded portion (4), a male sealing surface (28) as well as a male stop (24), and a female tubular element (3) comprising a female threaded portion (5), a female sealing surface (29) as well as a female stop (25). Said male (4) and female (5) threaded portions comprising respectively several male (6) and female (7) threading teeth originating from the same threading helix. The definition of a threading helix is given in ISO 5408. A male threading tooth (6) comprises a male stab flank (14) and a male load flank (12). A female threading tooth (7) comprises a female stab flank (15) and a female load flank (13).

The joint of FIG. 1 is represented during its use during a tensile force, for example subjected to the weight of the column in tension vertically, in the direction of the arrow. In this case of normal use, there are the male (12) and female (13) load flanks which are in contact. The male (14) and female (15) stab flanks are not necessarily in contact and delimit a space which consists of a threaded axial gap "TAG" threads. However, the stops and the sealing surfaces can be in contact.

Figure 3:
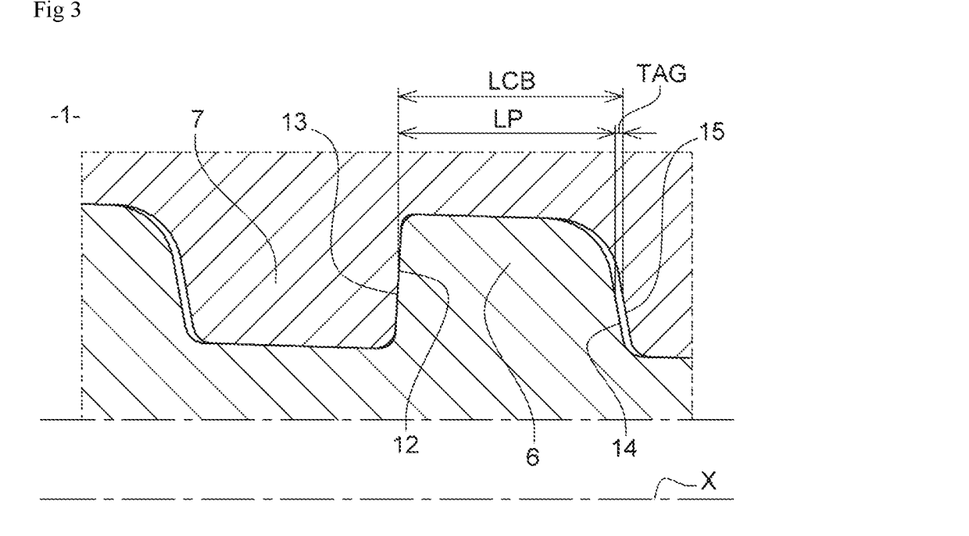
FIG. 3 schematically describes, in a longitudinal sectional view, a male and female threading tooth of a tubular threaded joint according to the invention.

Another way to define the threaded axial gap "TAG" is the difference between the width of the recess (LCB) between two female threading teeth and the width of the male threading tooth (LP), as shown in FIG. 3.

Figure 2:
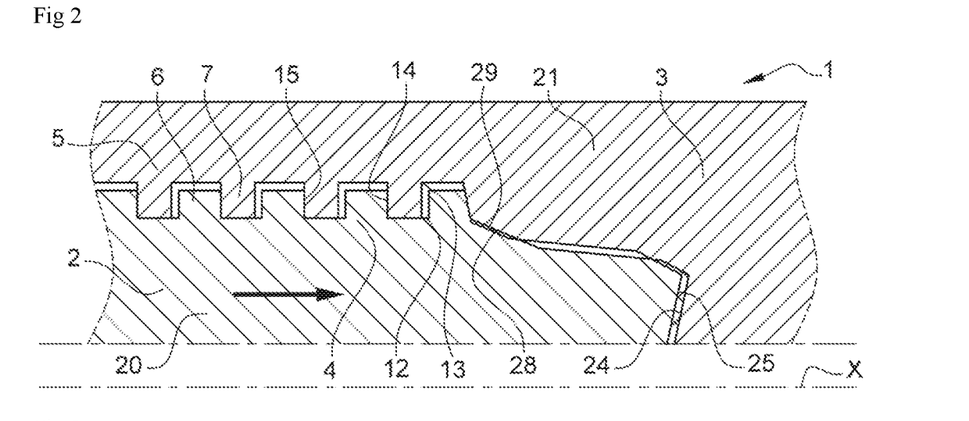
FIG. 2 schematically describes, in a longitudinal sectional view, a tubular threaded joint according to the invention, with contact of the stab flanks.

FIG. 2 describes a tubular threaded joint (1) according to the invention during an aggravated use, for example when there is a temperature difference which induces compression forces at the threaded joint. The connection will tend to be deformed under the action of said compression forces. In this case, it is the male stab flanks (14) which are in contact with the female stab flanks (15). The stress on the male (28) and female (29) sealing surfaces and the male (24) and female (25) stops which were already in contact will increase. There is increased interference at the male (28) and female (29) sealing surfaces and the male (24) and female (25) stops.

FIG. 2 shows that the compression on the stab flanks cannot be increased or aggravated indefinitely and that beyond a certain limit an unwanted axial interference can be generated and leading to a plasticisation of the threading or even the deterioration thereof Thus, a too small threaded axial gap in the mounted state without stresses between the male (14) and female (15) stab flanks leads to this aggravation.

FIG. 3 shows a detail of the tubular threaded joint (1) according to the invention and in particular a male (6) and female (7) threading tooth in the mounted state. The male threading tooth (6) comprises a male load flank (12) and a male stab flank (14). The female threading tooth (7) comprises a female load flank (13) and a female stab flank (15). The two male (14) and female (15) stab flanks delimit a space whose axial dimension is a threaded axial gap "TAG". Said threaded axial gap TAG is greater than or equal to a minimum gap TAGmin such that:

$$TAGmin = IT(\min) * \left(1/2 \frac{(LFpin\min)}{(DPin\min)} + 1/2 \frac{(LFbox\min)}{(Dbox\min)}\right) + (4 * Epcoat) \quad [\text{Math. 3}]$$

With: 0≤Epcoat≤Epcoat max
Where:

| | |
|---|---|
| TAGmin | Minimum value of the threaded axial gap in mm |
| ITmin | Minimum value of the pitch mismatch tolerance in mm |
| LFpinmin | Minimum value of the axial male threading length in mm |
| LFboxmin | Minimum value of the axial female threading length in mm |
| Dpinmin | Minimum value of the distance of the male pitch tolerance in mm |
| Dboxmin | Minimum value of the distance of the female pitch tolerance in mm |
| Epcoat | Value of the thickness of an anticorrosive and/or lubricating coating in mm |

Another manner to define the threaded axial gap "TAG" is the difference between
the width of the recess (LCB) between two female threading teeth and the width of the male threading tooth (LP), taken at mid-height of the male thread (6).

Figure 12:
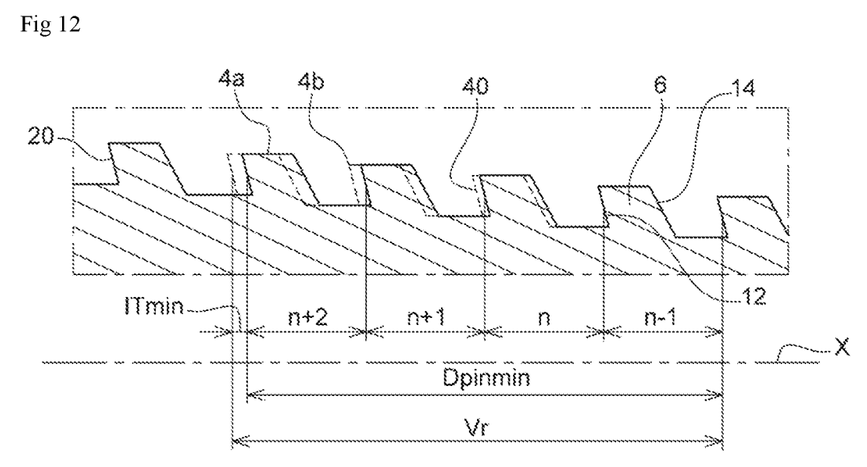
FIG. 12 schematically describes, in a longitudinal sectional view, a tubular threaded joint comprising an accumulation of pitch error.

TAGmin corresponds to a minimum threshold value from which the effect of any threading offset resulting from an accumulation of pitch error is cancelled, this accumulation can also originate from several individually acceptable pitch errors. The accumulation of pitch errors and the aggravation which would result therefrom is illustrated in FIG. 12.

The minimum gap TAGmin is determined depending on the minimum value of the pitch mismatch tolerance ITmin, the minimum value of the axial male threading length LFpinmin, the minimum value of the axial female threading length LFboxmin, the minimum value of the distance of the male pitch tolerance Dpinmin, and finally the minimum value of the distance of the male pitch tolerance Dboxmin.

The threaded joint may comprise a threading coating and therefore the additional parameter of the coating thickness Epcoat must be taken into account. In the case of FIG. 3 there is no coating and therefore Epcoat is equal to 0.

Figure 4:
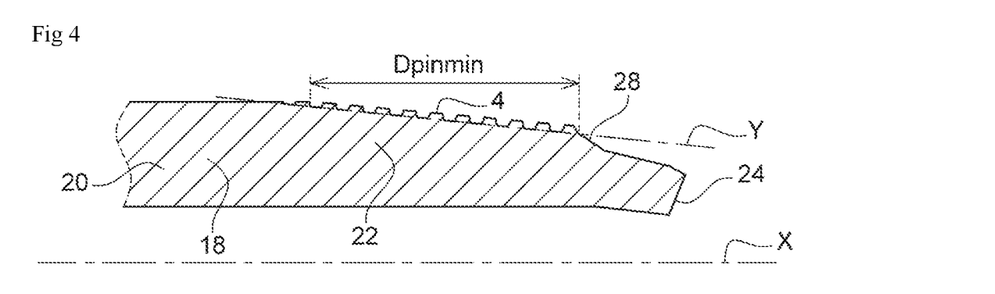
FIG. 4 schematically describes, in a longitudinal sectional view, a male end according to the invention.
Figure 5:
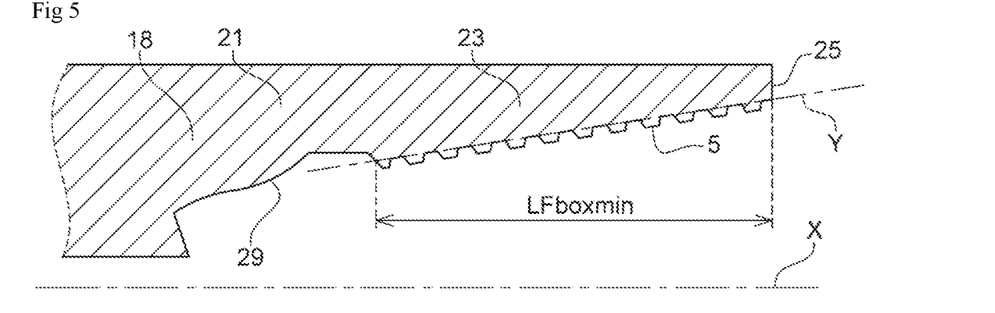
FIG. 5 schematically describes, in a longitudinal sectional view, a female end according to the invention.

The term "axial male threading of male LFpinmin or female LFboxmin" mean the total length of the threading along the threading axis of the tube. This total length of the threading is measured from the thread root of the first tooth to the thread root of the last tooth, as illustrated in FIGS. 4 and 5.

The term "distance of the male Dpinmin or female Dboxmin pitch tolerance" means the length over which the pitch is monitored, that is to say, the total length of the perfect threads. A perfect thread can be defined as opposed to an imperfect thread, that is to say, a thread whose height is not complete. It is also referred to as a vanishing thread for an imperfect thread.

The term "tolerance of a pitch error" means the acceptable pitch error deviations relative to the nominal plane.

The term "pitch mismatch tolerance" means the difference between the male pitch error tolerance and the female pitch error tolerance.

The term "pitch" means the distance between two successive load flanks as defined by ISO 5408.

The pitch mismatch tolerance value ITmin can be comprised between 0.040 and 0.080 mm, preferably between 0.048 and 0.072 mm. Thus the pitch error is measurable by a conventional monitoring device, for example described in API 5B1. Indeed, below the minimum value it is necessary to use more expensive apparatuses whose measurement result is not necessarily assured. Above the maximum value, the minimum value of the threaded axial gap TAG min is too significant.

It should be noted that the TAGmin value depends indirectly on the axial threading length.

In order to simplify the approach, empirical values of IT min and TAGmin have been determined and are given in the following Table 1 for tube connections according to the nominal external diameter of the tube (OD):

TABLE 1

| OD (in mm) | Thickness of the tube (in mm) | TAGmin (in mm) | IT (mm) |
|---|---|---|---|
| 114.30 | 12.7 | 0.126 | 0.052 |
| 139.70 | 12.09 | 0.114 | 0.041 |
| 244.48 | 13.84 | 0.165 | 0.068 |
| 355.60 | 20.62 | 0.231 | 0.065 |

FIG. 4 shows a male end (20) according to the invention in a longitudinal sectional view, comprising a male lip (22) and a metal body (18). Said male lip comprises a male threaded portion (4), a male stop surface (24) as well as a male sealing surface (28). The male threaded portion (4) comprises several male threading teeth (6) which succes-sively extend along a thread root line Y. The threading axis is parallel to the axis X which extends longitudinally.

The male or female pitch tolerance distance corresponds to the length over which the pitch is monitored, that is to say, the total length of the perfect threads. A perfect thread can be defined as opposed to an imperfect thread, that is to say a thread whose height is not complete. It is also referred to as a vanishing thread for an imperfect thread. For a male threaded end (20) the pitch tolerance distance is defined by Dpinmin.

FIG. 5 describes a female end (21) according to the invention in a longitudinal sectional view comprising a female lip (23) and a metal body (18). Said female lip comprises a female threaded portion (5), a female stop surface (25) as well as a female sealing surface (29). The female threaded portion (5) comprises several threading teeth (7) which successively extend along and from a thread root line Y. The threading axis is parallel to the axis X which extends longitudinally.

Figure 6:
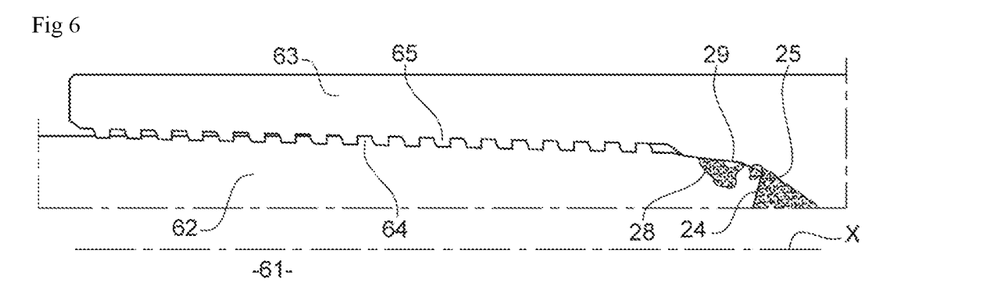
FIG. 6 schematically describes, in a longitudinal sectional view, a finite element analysis of a tubular threaded joint according to the state of the art.

FIG. 6 schematically shows, in a longitudinal sectional view, a tubular threaded joint (61) according to the state of the art with representation of stresses by a finite element analysis (FEA). The tubular threaded joint (61) comprises a male tubular element (62) comprising a male threaded portion (64), a male sealing surface (28) as well as a male stop (24), and a female tubular element (63) comprising a female threaded portion (65), a female sealing surface (29) as well as a female stop (25). In the case of FIG. 6, the joint comprises a threaded axial gap that is to say a TAG of 0.250 mm for a connection with an external diameter (OD) of 139.7 mm. With reference to Table 2 below, a gap of 0.250 mm is greater than the value of TAGmax indicated for a connection of 139.7 mm of nominal external diameter.

The dark areas in FIG. 6 correspond to areas of plasticisation resulting from mechanical compressions such as could be visualised on a finite element analysis (FEA). In FIG. 6 two distinct areas of plasticisation can be observed, the first being that of the male sealing surface (28) and the second that of the two male (24) and female (25) stops. The plasticisation of the stops can be considered as normal and expected. The plasticisation of the male sealing surface (28) is however not acceptable unlike that of the stops and constitutes a major risk of leakage or failure.

Figure 7:
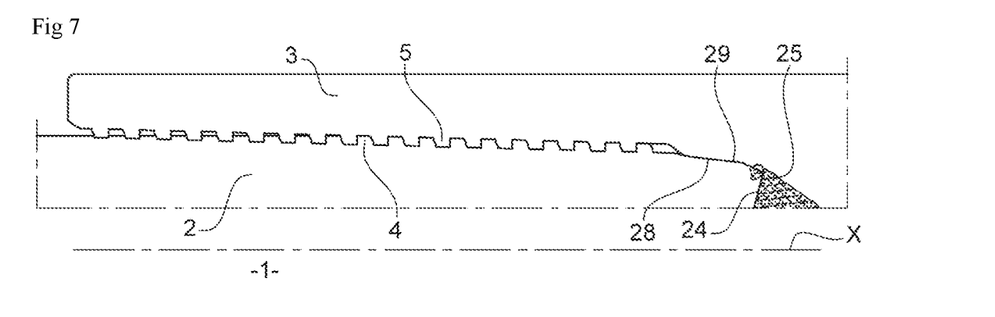
FIG. 7 schematically describes, in a longitudinal sectional view, a finite element analysis of a tubular threaded joint according to the invention.

FIG. 7 schematically describes, in a longitudinal sectional view, a tubular threaded joint (1) according to the invention resulting from a finite element analysis. The tubular threaded joint (1) comprises a male tubular element (2) comprising a male threaded portion (4), a male sealing surface (28) as well as a male stop (24), and a female tubular element (3) comprising a female threaded portion (5), a female sealing surface (29) as well as a female stop (25). The joint in FIG. 7 is different from the joint in FIG. 6 at the threads, arranged so that the threaded axial gap TAG of the joint in FIG. 7 is 0.120 mm, that is to say less than the TAGmax of the connection. The finite element analysis (FEA) reveals an absence of plasticisation of the male sealing surface (28). In a configuration according to the invention, the threaded axial gap TAG is small enough for the stab flank of the male and female threading teeth to be in contact with each other without reaching the stage of plasticisation of the sealing surfaces. Under these conditions, the threading is sufficiently in contact not to interfere while slowing down or compensating for the compression forces. The sealing is therefore improved. The threading therefore plays a supporting role without being damaged and solves the problem of aggravation discussed in FIG. 2.

Figure 8:
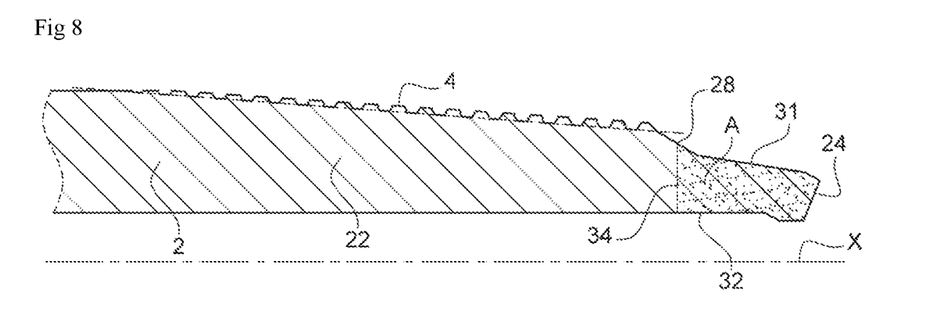
FIG. 8 schematically describes, in a longitudinal sectional view, a lip of a male tubular threaded element.

FIG. 8 shows a male tubular element (2) according to the invention, having a longitudinal axis X, comprising a male lip (22), a male threaded portion (4) and a male stop (24).

The threaded axial gap TAG is defined relative to the surface area of the cross section (A) of the male lip (22) "PinLipSurface", in other words the cross section of the male tubular element at the male lip, between the sealing surface and the stop surface. The threaded axial gap TAG is less than or equal to a maximum gap TAGmax such that:

$$TAGmax = a*PinLipSurface + b + (4*Epcoat) \qquad [\text{Math 4}]$$

With: 0≤Epcoat≤Epcoat max
  a=0.00053
  b=0.14
Where:
PinLipSurface Value of the cross-sectional area of the male lip between the sealing surface and the stop surface in mm²
a Value of the slope of the correlation
b Value of the intercept
EpcoatValue of the thickness of an anticorrosive and/or lubricating coating in mm The term "cross-sectional area (A) of the male lip (22)" means the surface delimited by the male stop (24) on one side, the profile of the outer surface or of the side of the threading (31), an inner surface profile (32) opposite the outer surface and finally delimited by a radially oriented segment (34) and passing through a midpoint of the male sealing surface (28).

The maximum gap TAGmax is determined relative to the dimensions of the male tubular element (2) or of the male threaded end (20) thereof, taking into consideration that the female tubular element (3) or the corresponding female threaded end (21) thereof is dimensioned so that the sealing surfaces are in contact after assembly of the male threaded end (20) with the female threaded end (21).

"a" is the value of the slope of the correlation and "b" the value of the intercept of the straight line representing TAGmax as a function of PinLipSurface.

For purposes of simplification, the applicant has calculated a set of practical values according to the nominal diameter of the tube for the values of TAGmax.

TABLE 2

| OD (in mm) | Thickness of the tube (in mm) | TAGmax (in mm) | Surface pin lip (mm²) |
| --- | --- | --- | --- |
| 114.30 | 12.7 | 0.166 | 100.73704 |
| 139.70 | 12.09 | 0.154 | 94.9086502 |
| 244.48 | 13.84 | 0.255 | 120.720601 |
| 355.60 | 20.62 | 0.271 | 187.84287 |

As shown in the examples in Tables 1 and 2, the values of TAGmin and TAGmax can differ from one connection to another.

According to one aspect of the invention, the threaded axial gap TAG is comprised between two values TAGmin and TAGmax and such that:

TAGmin<TAGmax

Thanks to this feature, for the same type of connection or dimensioning, it is possible to determine a threaded axial gap (TAG) which respects a minimum threshold from which it is guaranteed to compensate for the effect of any offset of the treading resulting from an accumulation of pitch errors, while simultaneously eliminating any risk of loss of sealing performance caused by the accumulation of pitch errors.

Figure 9:
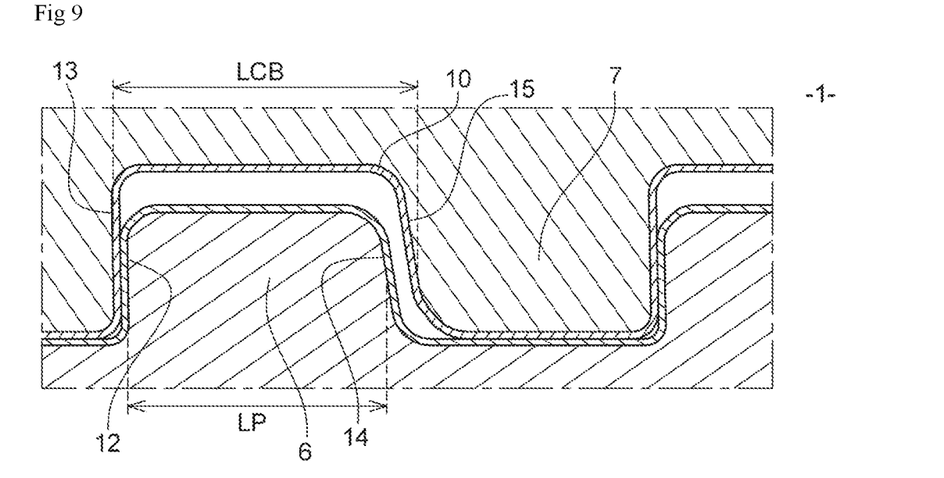
FIG. 9 schematically describes, in a longitudinal sectional view, the arrangement of a male thread and a female thread according to the invention after screwing.

FIG. 9 describes an embodiment for which the invention comprises a solid or semi-solid coating. The coating has a lubricating and/or anticorrosion function. This type of joints with coating is more and more widespread to avoid the use of screwing greases. FIG. 9 describes a tubular threaded joint (1) according to the invention and in particular a male threading tooth (6) and a female threading tooth (7) in the assembled state, in a sectional view along a longitudinal axis X. The male threading tooth (6) comprises a male load flank (12) and a male stab flank (14). The female threading tooth (7) comprises a female load flank (13) and a female stab flank (15). The male (14) and female (15) stab flanks as well as the male (12) and female (14) load flanks comprise an anticorrosive and/or lubricating solid coating (10). One manner to define the threaded axial gap "TAG" is the difference between the width of the recess (LCB) between two female threading teeth and the width of the male threading tooth (LP). Said threaded axial gap TAG is greater than or equal to a minimum gap TAGmin such that:

$$TAGmin = IT(\min) * \left(1/2 \frac{(LFpin\min)}{(DPin\min)} + 1/2 \frac{(LFbox\min)}{(Dbox\min)}\right) + (4*Epcoat) \qquad [\text{Math. 5}]$$

With: 0≤Epcoat≤Epcoat max
Where:

| | |
| --- | --- |
| TAGmin | Minimum value of the threaded axial gap in mm |
| ITmin | Minimum value of the pitch mismatch tolerance in mm |
| LFpinmin | Minimum value of the axial male threading length in mm |
| LFboxmin | Minimum value of the axial female threading length in mm |
| Dpinmin | Minimum value of the distance of the male pitch tolerance in mm |
| Dboxmin | Minimum value of the distance of the female pitch tolerance in mm |
| Epcoat | Value of the thickness of an anticorrosive and/or lubricating coating in mm |

The developments in FIG. 3 are applicable to FIG. 9. In this configuration, the coating thickness Epcoat is multiplied by a factor of 4 which takes into consideration the 4 coating thicknesses present on two male (14) and female (15) stab flanks and two male (12) and female (13) load flanks. The parameter 4*Epcoat in the equation contributes to having a larger TAGmin. In this case, Epcoat is an average of the thicknesses on the male (12) and female (13) load flanks and male (14) and female (15) stab flanks taken in combination, but the invention can also provide different thicknesses Epcoat depending on the concerned stab or load flanks. The coating thickness Epcoat is an average thickness of coatings on thread flanks.

The thickness of a solid coating can contribute to increase the contact pressure on the flanks of a thread, thus increasing the risk of embrittlement or plasticisation. The invention allows screwing without an additional risk of embrittlement or plasticisation of a connection due to the presence of such a coating.

According to a complementary aspect, the maximum value of the thickness of an anticorrosive and/or lubricating coating Epcoat max (10) is equal to 0.0075 mm. Preferably the coating (10) has a thickness comprised between 0.0010 and 0.0075 mm.

Thanks to this feature, the configuration can incorporate a wide variety of solid anticorrosive and/or lubricating coatings, which guarantees absorbing any risk of pitch mismatch to a maximum thickness of 0.0075 mm.

The anticorrosive and/or lubricating coating (10) may comprise a layer comprising Zinc and Nickel which has excellent anticorrosive and lubricating properties.

The developments in FIG. 9 are applicable for all or part of the male (4) and female (5) threaded portion, when the invention comprises a coating (10).

Figure 10:
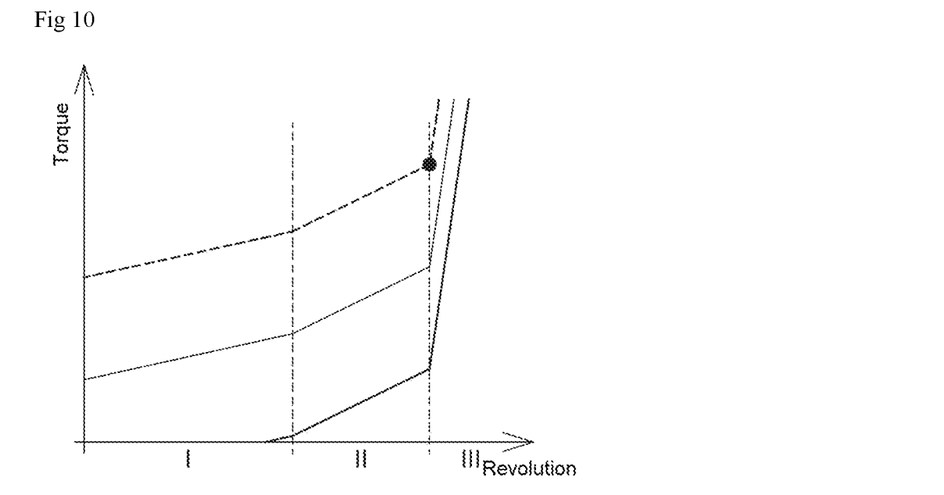
FIG. 10 describes a screwing curve of a tube according to the state of the art comprising an accumulation of an unabsorbed pitch error.

FIG. 10 shows a screwing curve of a tube according to the state of the art comprising an accumulation of unabsorbed pitch error. A method used to ensure that the connections are correctly assembled consists in supervising the torque applied by a clamp against the number of revolutions. The term "clamp" means a large capacity self-blocking wrench used to grip the male and female components of the connection and apply a tightening/loosening torque. By connecting a computer to the load cell on the clamp and an electronic revolution counter, a graph can be plotted showing the torque on the vertical axis and the number of revolutions on the horizontal axis as represented in FIG. 10.

The first portion "I" corresponds to the tightening step where there is contact between the threads, more particularly at least contact between the respective stab flanks of a male (20) and female (21) threaded end. At this point there is little resistance for the first few revolutions until the respective threads begin to interfere radially. The second portion "II" corresponds to the contact between the male and female sealing surfaces and which results in a first sharp increase in the curve. Finally, the last portion "III" corresponds to the meeting of the stop surfaces of the male and female tubular threaded elements, which generates a sudden increase in the torque on small amplitudes of relative rotation of the male and female components relative to each other.

Figure 11:
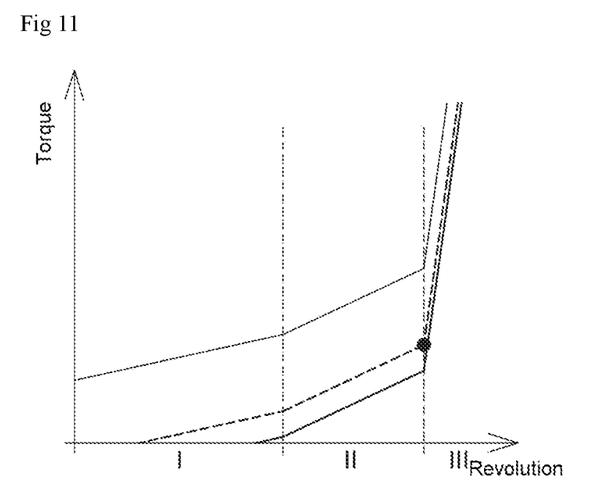
FIG. 11 describes a screwing curve according to the invention comprising an accumulation of absorbed pitch error.

As it is impossible to obtain an identical torque at each screwing of two tubular threaded elements are screwed in, an acceptance window exists, represented by the two solid line screwing curves in in FIGS. 10 and 11. Thus a connection comprising an accumulation of unabsorbed pitch error by the configuration, represented by the dashed curve in FIG. 10, will cause an offset in the screwing phases, visible on the graph with a curve which is found outside the acceptance window. However at this stage, it is too late, the tube may no longer be used or repaired and is therefore likely to be rejected, thus generating losses.

FIG. 11 shows a dashed screwing curve for the assembly of a joint according to the invention, comprising an accumulation of absorbed pitch error. The threaded axial gap is large enough to absorb any accumulation of pitch error. There is therefore an absence of offset and consequently the curve is well comprised within the acceptable window represented by the two solid line screwing curves.

FIG. 12 shows superimposed a first male threaded end (20) and a second male threaded end (40), each comprising a male threaded portion (4a) and (4b). Each male threading tooth (6) comprises a load (12) and stab (14) male flanks. The portion (4a) of the first male threaded end (20) represented in solid lines does not comprise a pitch error, corresponding to the value in the plane or to the theoretical value of the minimum value of the distance of the male pitch tolerance in mm Dpinmin. The portion (4b) of the second male threaded end (40) being differentiated by dotted lines, therefore showing an offset of the load flanks, comprises an accumulation of pitch error and corresponds to the real value Vr.

Each of the first (20) and second (40) male threaded end comprises several threading "pitches" corresponding to an increasing or decreasing position level "n" represented in FIG. 12 by "n−1", "n", "n+1" etc . . .

The term "pitch" means the distance between two successive male or female load flanks as defined by ISO 5408.

In the context of FIG. 12, the pitches are defined by the successive male load flanks. The theoretical value Dpinmin corresponds to the value in the plane of the considered total pitch. By comparing the theoretical value Dpinmin and the real value Vr, it is possible to note a difference resulting from the offset caused by the accumulation of pitch error. This difference corresponds to the minimum value of the pitch mismatch tolerance ITmin.

An exemplary embodiment of a configuration according to the invention can be obtained according to the following steps:

Machining of a male threaded element and a female threaded end with a numerically controlled lathe. The machining is done on the male threaded end over a total length of 96.94 mm. The pitch error is monitored over a length Dpinmin=55.88 mm on the male threaded end. The machining is carried out using a shape machining insert, this shape is the negative of the male threading recess. The width of the insert is 2.567 mm and the machining pitch 5.08 mm. The machining is done on the female threaded end over a length of 82.98 mm and the pitch error is monitored over a length of 76.20 mm. The machining is carried out with a shape insert whose width is 2.647 mm and a machining pitch of 5.08 mm.

Optionally, the invention may include the following steps:

Sandblasting of these threaded elements with F80 brown corundum

Application of ZnNi by electro-deposition on the 2 threaded elements

Application of chromium III passivation by immersion on the 2 threaded elements

Application of a lubricating coating by pneumatic spraying on the 2 threaded elements.

The invention claimed is:

1. A tubular threaded joint for the drilling, operation of hydrocarbon wells, transport of oil and gas, transport or storage of hydrogen, carbon capture or geothermal energy, comprising a male tubular element and a female tubular element, each of said male or female tubular elements comprising respectively a male threaded portion and a female threaded portion, one or the other of the male or female threaded portions optionally comprising an anticorrosive and/or lubricating solid coating, said male threaded portion and female threaded portion comprising respectively at least one male threading tooth and one female threading tooth and a threaded axial gap TAG ensuring a space, in the mounted state, between a stab flank of said male threading tooth and a load flank of said female threading tooth, wherein said threaded axial gap TAG is greater than or equal to a minimum gap TAGmin such that:

$$TAGmin = ITmin * \left( \frac{1}{2\frac{(LFpin\text{min})}{(Dpin\text{min})}} + \frac{1}{2\frac{(LFbox\text{min})}{(Dbox\text{min})}} \right) + (4 * Epcoat)$$

with: $0 \leq Epcoat \leq Epcoat\ max$
where:

TAGmin: minimum value of the threaded axial gap in mm
ITmin: minimum value of a pitch mismatch tolerance in mm -continued

| | |
|---|---|
| LFpinmin: | minimum value of an axial male threading length in mm |
| LFboxmin: | minimum value of an axial female threading length in mm |
| Dpinmin: | minimum value of a distance of the male pitch tolerance in mm; |
| Dboxmin: | minimum value of a distance of the female pitch tolerance in mm; |
| Epcoat: | value of a thickness of the anticorrosive and/or lubricating coating in mm; and |
| Epcoat max: | maximum value of the thickness of the anticorrosive and/or lubricating coating. |

2. The tubular threaded joint according to claim 1, wherein the pitch mismatch tolerance value is comprised between 0.040 mm and 0.080 mm.

3. The tubular threaded joint according to claim 1, wherein the threaded axial gap TAG is less than or equal to a maximum gap TAGmax such that:

TAGmax=$a$*PinLipSurface+$b$+(4*Epcoat)

with: 0≤Epcoat≤Epcoat max,
$a$=0.00053 mm$^{-1}$, and
$b$=0.14 mm, where:
PinLipSurface; of the cross-sectional area of a male lip between a sealing surface and a stop surface in mm$^{-2}$;
$a$: value of the slope of the correlation; and
$b$: value of the intercept.

4. The tubular threaded joint according to claim 1, wherein at least one of the male threaded portion or female threaded portion comprises the anticorrosive and/or lubricating coating and in that the value of the thickness of the anticorrosive and/or lubricating coating Epcoat is greater than zero.

5. The tubular threaded joint according to claim 4, wherein the anticorrosive and/or lubricating coating has a thickness with a maximum value Epcoat max equal to 0.0075 mm.

6. The tubular threaded joint according to claim 1, wherein the anticorrosive and/or lubricating coating comprises a layer comprising zinc and nickel.

7. The tubular threaded joint according to claim 1, wherein the pitch mismatch tolerance value is comprised between 0.048 mm and 0.072 mm.

* * * * *